July 6, 1943.  W. W. JONES  2,323,402
PARKING METER
Filed Oct. 9, 1940  6 Sheets-Sheet 1

July 6, 1943.  W. W. JONES  2,323,402
PARKING METER
Filed Oct. 9, 1940  6 Sheets-Sheet 2

Inventor.
Whitney W. Jones
By Spear, Donaldson and Hull
Attys

July 6, 1943.    W. W. JONES    2,323,402
PARKING METER
Filed Oct. 9, 1940    6 Sheets-Sheet 3

Inventor
Whitney W. Jones
by Spear, Donaldson & Hull
Attys

Inventor
Whitney W. Jones
by Spear, Donaldson + Hall
Attys

July 6, 1943.  W. W. JONES  2,323,402
PARKING METER
Filed Oct. 9, 1940  6 Sheets-Sheet 5

July 6, 1943.  W. W. JONES  2,323,402
PARKING METER
Filed Oct. 9, 1940  6 Sheets-Sheet 6

Patented July 6, 1943

2,323,402

UNITED STATES PATENT OFFICE 2,323,402

PARKING METER

Whitney W. Jones, Philadelphia, Pa.

Application October 9, 1940, Serial No. 360,465

11 Claims. (Cl. 194—1)

This invention relates to time indicating devices of the type employed as automobile parking meters.

In devices of this character, it is desirable that the coin which has been deposited be visible for inspection, so that its genuineness may be determined. It is also desirable that the remaining parking time which is indicated by the device be readily determinable from a distance. These two desiderata are obtained with the device of the invention by employing the coin itself as the pointer. Both sides of this coin are visible throughout the alloted parking time so that it may be examined. Since the coin is of large size, its position may be ascertained from a distance. Moreover, the coin is visible from both sides of the device.

It is sometimes required that these devices accommodate coins of more than one denomination. This may be desirable so that a coin of small denomination may be deposited if it is desired to obtain a parking time of shorter duration than the maximum time which is afforded by the coin of larger denomination. Such a device may also be desirable so that if a single coin of the large denomination is not at hand, as, for example, a nickel, a suitable number of smaller denomination coins may be placed in the mechanism, as, for example, five pennies, to obtain the full parking time permitted.

It is important that these time indicating devices accurately indicate the time for each newly deposited coin without interference by a formerly deposited coin, or coins. That is, the time to be indicated by the newly deposited coin should be neither reduced nor extended by the presence of another coin which was earlier deposited. The device of the invention is wholly free of any such interference.

Another feature of the invention is the provision of means for obtaining a predetermined amount of excess time with the device. Such excess time is required by some ordinances, and since it may vary in extent with different cities, it is important that the device make it possible to regulate this excess time. With the device of the invention, it is possible to readily afford any desired amount of excess time, and, moreover, this provision in no way affects the operation of the device in indicating the normal time.

It is also important in such a parking time indicating device that it afford proof against tampering so that it may not be taken apart by an unauthorized person who may desire to secure the coins which have already been deposited. The device of this invention is tamper-proof.

Other features of the invention will hereinafter appear.

Referring first to Figs. 1 to 16, inclusive, the coin is passed through an opening 1 in an enclosing casing made up of an upper shell 2 and a lower shell 3. This opening 1 is protected by an overhanging hood 4. From the opening 1, the coin passes by gravity to and through an opening 5 in a front plate 6 of the operating mechanism. Another plate 7 is spaced from the plate 6 a distance slightly greater than the thickness of the coin, and after the coin enters the opening 5, it falls between the two plates 6 and 7, and comes to rest upon the periphery of a rotatable disc 8.

The plates 6 and 7 are spaced apart at their lower ends by means of bosses 9 and 10 which surround the bolt holes 11 and 12, and which are formed integrally with the plate 6. At their upper ends, the plates are held apart by a lug 14 and an enlarged lug 15 which surrounds the bolt hole 16. The upwardly facing surface 17 of this lug 15 forms an inclined runway which delivers the coin which has entered through the opening 5, over to the downwardly moving side of the disc 8. To prevent a return movement of the coin after it has passed downwardly along the surface 17, a detent 18 is provided.

The plate 6 has a central recess 20 to receive a side portion of the rotatable disc 8. This recess is completely cut through the plate at 20' to afford an opening through which the contact between the coin and disc may be observed. The plate 7 is formed with a central opening 21 to receive the disc 8. Because of this relationship, the disc 8 may be thicker than the space between the plates 6 and 7, and this is desirable to insure that the coin will remain upon the periphery of the disc and cannot become displaced sideways off of the disc 8.

Figures 10, 10A, 11, 12, 17:
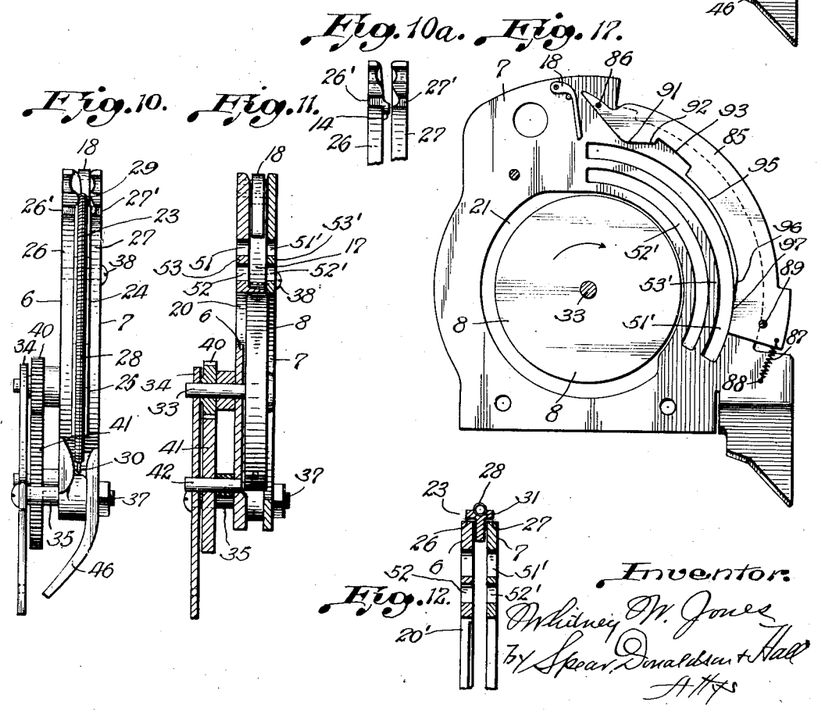
Fig. 10 is a side elevation of the operating mechanism from the right of Fig. 5.
Fig. 11 is a section on the line 11—11 of Fig. 5.
Fig. 12 is a section on the line 12—12 of Fig. 5.
Fig. 17 is a side elevation similar to Fig. 9 showing a modification of parts of the operating mechanism.
Figure 18:
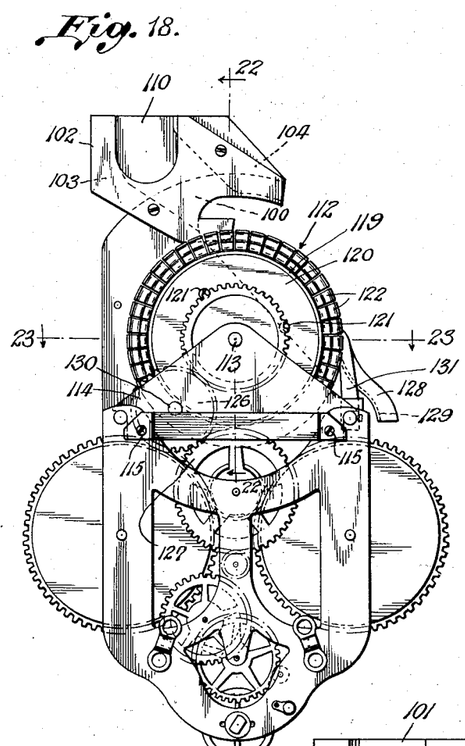
Fig. 18 is a front elevation of the operating mechanism of another embodiment of the invention.
Figure 19:
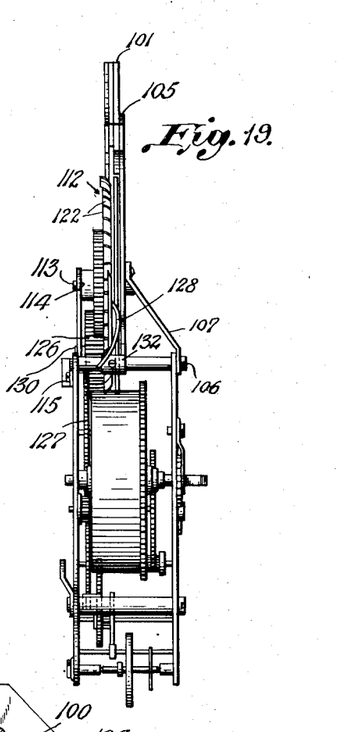
Fig. 19 is a side elevation from the right of Fig. 18.
Figure 20:
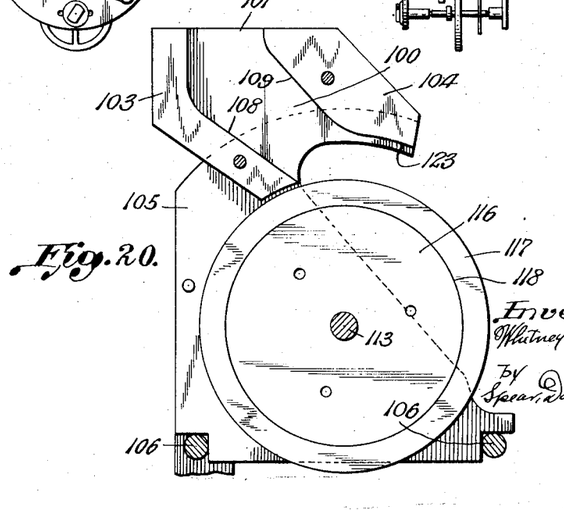
Fig. 20 is an enlarged view of the upper portion of Fig. 18, certain forward parts being omitted.
Figure 21:
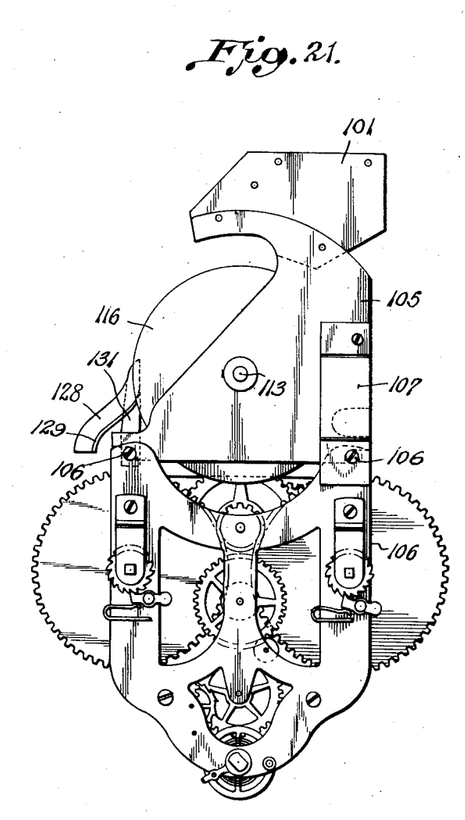
Fig. 21 is a rear elevation of Fig. 18.

After the coin has rolled down the inclined surface 17 and contacted the periphery of the disc 8, it rolls around the periphery of the disc until the outer edge of the coin strikes the presser block 23. As a feature of this embodiment of the invention, three presser blocks, 23, 24, and 25, are provided. These presser blocks are T-shaped in cross-section, and their central stem or leg portions are thin enough to freely enter between the plates 6 and 7, as shown in Fig. 12. The arms or side portions of the presser blocks rest upon the outer edges 26 and 27 respectively of the plates 6 and 7 to limit inward movement of the presser blocks.

These edges 26 and 27 preferably are concentric with the periphery of the disc 8. Shoulders 26', 27' at both ends of the edges 26 and 27 retain the presser blocks against movement along the edges 26 and 27.

The presser blocks 23, 24, and 25 are urged inwardly toward the disc by means of a coiled spring 28 which is secured at its ends to pins 29 and 30 which extend between the plates 6 and 7. This spring is under a slight tension and bears against the outer faces of the presser blocks 23, 24, and 25 to urge them inwardly toward the disc 8. To retain the spring 28 upon the presser blocks, their outer faces may be grooved as shown at 31 in Fig. 12.

The coin will be moved in an orbital path in the space between the periphery of disc 8 and the inwardly facing surfaces of presser blocks 23, 24, and 25, due to the rotation of the disc 8 by the clock mechanism indicated at 32. For driving the disc, it is attached to a shaft 33 which has a bearing in the plate 6, and also in a plate 34. Plate 34 is secured in spaced relation from plate 6 by means of collars 35 upon the bolts 37. The bolts 37 pass through the plate 34, through the holes 11 and 12 of plate 6 and similar holes through the plate 7, to clamp these three plates in fixed relation. Another bolt 38 passes through a hole in plate 7 and threads into the hole 16 of plate 6 to further secure the plates 6 and 7 together.

A gear 40 is secured to the shaft 33, and it meshes with a gear 41 fixed to the shaft 42. Shaft 42 is rotatably mounted in bearings in plates 34 and 6. Gear 41 also meshes with a driving gear 43 of the clock mechanism. Plate 34 is attached to the clock framework by bolts 36 which pass through a framework member of the clock mechanism and thread into the plate 34.

The inwardly facing surface of presser block 23 is cut away at 44 (Fig. 8), so that this portion of the inner surface will not contact the coin. The remaining surface 45 is slightly closer to the periphery of disc 8 than the diameter of the coin, with the result that the presser block is moved slightly outwardly against the tension of spring 28 as the coin is advanced under the surface 45 by the rotation of disc 8. In this manner, the coin is urged into frictional contact with the periphery of the disc.

Since the coin has a true rolling motion upon the internal surface 45 of presser block 23, and also has a true rolling motion upon the periphery of disc 8, the coin is advanced in its orbital motion about the axis of the disc 8 with slight effort. Moreover, since there is no tendency toward slippage, the coin is advanced in a positive, regular manner, the rate of this advance being determined by the diameter of disc 8 and its speed of rotation.

The length of the surface 45 is such as to cause advance of the coin under the action of disc 8 in a predetermined time interval. This time interval will afford a slight additional time to the normal or maximum time for the coin to pass through the remainder of the device. This additional time is required by some city ordinances, and generally will be from four to ten minutes. After leaving the surface 45, the coin will pass at once beneath the cut away portion 44 and come against the presser block 24.

Presser block 24 ordinarily will have a continuous inwardly facing surface so that it will require a maximum time period for the advance of the coin thereunder. The coin will then be advanced along the inner surface of presser block 25, and eventually will drop from between the disc 8 and block 25. The coin will be directed by the curved lip 46 of plate 7 away from the clock mechanism and to a coin chute 47 within the lower shell 3 of the casing.

The total time required for the coin to pass beneath the presser blocks 24 and 25 should be the normal or maximum parking time afforded by the city ordinance. The necessary length of the inner surfaces of blocks 24 and 25 is readily ascertained from the rate of advance of the coin.

If the device is intended to register with coins only of a single denomination, as, for example, nickels only, the inwardly facing surface of presser block 25 would be similar to that of presser block 24, so that these two blocks would be interchangeable. That is, when these two presser blocks 24 and 25 are not being acted upon by a coin, their inner faces would be substantially concentric with the periphery of the disc and spaced from it radially at all points a distance slightly less than the diameter of the nickel.

If the device is intended to register with coins of two denominations, as, for example, nickels and pennies, the invention contemplates the formation of the inwardly facing surface of presser block 25 with a terminal portion 48 which projects toward the periphery of the disc 8. This projection 46 presents a slight shoulder 49 against which a penny will initially come to rest, after passing freely beneath the blocks 23 and 24 and the initial portion of block 25. Since all points of the inwardly lying surface 48 are slightly closer to the periphery of the disc than the diameter of a penny, the penny will be advanced between surface 48 and the disc by rotation of the disc 8. The presence of this inwardly lying surface portion 48 in no way interferes with the operation of the mechanism with a nickel, since the nickel will move past the shoulder 49 and along the surface 48 in a regular manner.

The provision of the presser block 25 with the inwardly lying surface 48 makes it possible to use the device to indicate only a short period of time. Thus, if the nickel is intended to indicate an hour's duration, exclusive of the additional time afforded by surface 45 of presser block 23, the shoulder 49 may be so located that a penny will indicate twelve, or more, or less, minutes. Also, since a penny passes freely beneath the presser blocks 23 and 24 and is arrested only by the shoulder 49, several pennies may be delivered into the machine at once. As many as five pennies may be placed into the machine at once, so that a full hour's time will be marked off with them. This is useful if a nickel should not be at hand. These pennies will merely lie one in back of the other about the periphery of the disc, and will successively reach the shoulder 49 as the advance penny is dropped out.

In order that the coins will be visible from the exterior, the side plate 6 has formed therethrough the arcuate slots 51 and 52 leaving a central arcuate rib 53 concentric with the disc 8. Similar slots 51' and 52' and a rib 53' are formed in the plate 7, so that they are directly opposite the corresponding slots and rib of plate 6. Glass windows 50 and 50' may be located in the upper shell 2 in both side walls thereof, and in registration with the slots 51, 52, and 51', 52' in order that the passage of the coin through the device will be visible.

The ribs 53 and 53' are preferably so located that they lie opposite the points within the coin slot at which a row of pennies upon disc 8 contact each other. Because of this relationship, the ribs 53 and 53' serve to prevent tilting of the coins within the coin slot and maintain the coins in peripheral contact with each other, so that one cannot get behind another and interfere with the operation of the device.

The provision of a plurality of presser blocks, such as 23, 24, and 25, is an important feature of the invention, and presents several advantages. Any one of these blocks may be changed without disturbing the other blocks. For example, if it is desired to change the amount of extra time which the device affords, it is necessary to merely replace the presser block 23 with one having a longer or shorter surface 45. The block 23 may be eliminated if additional time is desired. Or, if it is desired that the device have, or not have, provision for operating with coins of two denominations, it is merely necessary to use as the presser block 25 one having, or not having, the inwardly lying surface 48.

The provision of a plurality of presser blocks has the additional advantage that one coin does not interfere with the operation of another coin which may be passing through the device in advance thereof. Thus, it may frequently occur that before one coin has fully passed through the device, another coin, or several coins, may be deposited. This may occur when a person leaves the parking space before having exhausted his time and therefore before his coin has been discharged, and a newcomer occupies the parking space and deposits a new coin. It may even occur that the second person will leave and a third person will deposit a coin in the device before the first coin has passed out of the device. In such situations, with the present invention it is impossible for the newly deposited coin to drop ahead of its normal movement and cause a loss of parking time, and it is likewise impossible for the newly deposited coin to be delayed in its passage through the device so as to thereby give a longer parking time than that to which the person is entitled.

This feature of the invention of preventing improper advance of a coin through the device due to the presence of other coins in advance thereof, and still passing through the device, is accomplished by reason of the fact that not more than two coins can contact any one presser block at one time. This shortness of length of the presser blocks and the relatively universal tilting movement of which they are capable by reason of the yieldability of the spring 28, makes it possible for two coins to be under the same presser block, and for both to be urged into contact with the periphery of the disc so that the only movement of which they are capable is that which is imparted by rotation of disc 8. This would not be true if three or more coins could at the same time lie beneath a single presser block, as the last deposited one of the coins might be loose between the disc and the presser block, and could therefore drop ahead and give a shortened time reading.

In the illustrated embodiment of the invention, the presser blocks are of such short length that the dividing lines between them are on radii from the axis of disc 8 and passing through the centers of adjacent coins disposed about the periphery of the disc. Or, otherwise stated, the angle subtended by the ends of one presser plate is the same as the angle subtended by a coin upon the periphery of disc 8.

It has been noted that with the invention it is impossible for a newly deposited coin to be delayed in its passage through the device, by an earlier deposited coin. This is obtained by the provision of the cut-away portion 44 of the presser block 23. The presence of this cut-away portion between the surface 45 which affords the additional or extra time, and the internal surface of presser block 24, serves to cause a separation between successively deposited coins so that they cannot remain in contact throughout their passage through the machine. The advance coin, after leaving the surface 44, will drop away from the following coin and thus cause a space between the coins so that they cannot interfere with each other.

While not a necessary relationship, it has been found that the location of the coin along its path of movement is most easily judged if the total arcuate length of its movement is a quadrant. For this reason, the diameter of the disc 8 and the speed of rotation of the disc is such that the coin moves through approximately 90° from the time it initially contacts surface 45 of presser block 23 until it finally leaves the presser block 25.

Also, it is not necessary that the initial presser block 23 be employed solely to afford the desired amount of overtime. This initial presser block may, as shown by the modified presser block 23' of Fig. 16, have a recess 44' in its central part, leaving an inward surface 45a which will afford the desired overtime, and also leaving an inward surface 45b which will start the coin upon the regular part of its travel for indicating the normal parking time.

The coin chute 47 which the coin enters after leaving the curved lower lip 46 of plate 7 carries the coin around and away from the clock mechanism, so that it cannot become engaged in the gearing. A portion of the side wall of the coin chute is, however, constituted by the side plate 54 enclosing one of the springs of the clock mechanism. This spring fits into the curved notch at 54' of the inner wall of the coin chute so that the side plate 54 in effect widens this inner wall. At its lower end, the coin chute delivers the coin into a removable coin box 55. This coin box has a coin receiving passageway 56 through which the coin must pass to enter the box, but which is so shaped that removal of a coin through this passageway is practically impossible.

This is achieved by forming the passageway 56 of curved shape from its entrance at the exterior of the box to the opening 57 within the box. The entrance opening of the passageway 56 is generally vertical, whereas the outlet opening 57 is directed generally horizontal toward a vertical side wall of the box. The distance from this opening 57 to this side wall is preferably less than the diameter of the smallest coin to be handled, as this makes it more difficult to cause a coin to enter the opening 57 when an effort is made to dislodge it from the box.

Directly above the opening 57 is formed a vertical tapered recess 58 within the body of the box, and this recess reduces in width away from the opening 57. If an effort is made to dislodge a coin from the interior of the box, it will tend to enter the recess 58 instead of making the curve into the opening 57 of the passageway 56. To further insure the movement of the coin into the recess 58, instead of into the opening 57, the wall between the recess 58 and passageway 56 terminates at a point 59 lying inwardly of the opening 57. This offsetting of the point 59 will direct an escaping coin into the recess 58 where it will become wedged due to the tapering formation of the recess 58.

To further reduce the possibility of shaking a coin loose from the box, a recess 60 is formed in the body of the box in line with the opening 57. This recess 60 is horizontal and tapers away from the opening 57. A coin that should happen to enter the opening 57 will enter the recess 60 and become wedged therein. A wedged coin in recess 58 or 60 will thus indicate that an effort has been made to shake a coin loose from the box.

The coin box is preferably provided with a removable door 61. This door may slide in guideways formed in the box adjacent the open side of the box. A lock may be passed through the opening 62 in the sliding door, and a registering opening 63 in a lug on top of the box, to prevent unauthorized access to the interior of the box.

The coin box 55 occupies a space provided within the lower part of the lower shell 3 of the casing. Access to this space for insertion of or removal of the coin box is had by means of the door 64 of the casing. This door 64 has a lower lug 65 (Fig. 6) which lies against the interior of the wall below the door opening, and is provided at its upper end with a key controlled latch 66 which may be turned to lie against the interior of the wall above the door opening.

The door 64 bears against a lug 64' on the coin box, and this prevents inward movement of the door. This is a further feature of the invention, because if the coin box 55 is not in place, the door 64 will fall inwardly. This makes it impossible for an attendant to purposely fail to insert a coin box for the purpose of later recovering the coins which will drop into the open space intended for the coin box. The lug 64' also serves as a handle to the coin box 55.

To secure the entire device to a standard, as an upright pipe 67, the lower end of the shell 3 may be formed with a split skirt 68. Within this split skirt is a tapered plug 69 which may be drawn upwardly within the skirt by means of a bolt 70 threaded into the plug. The head of bolt 70 bears upon a cross plate at the lower end of shell 3. When the split skirt 68 is inserted in the pipe 67 and the bolt 70 is turned to draw the tapered plug 69 upwardly, the split skirt 68 is expanded against the interior of the pipe 67 and secures the shell 3 firmly against removal. Access is had to the head of bolt 70 to turn it only through the opening for the door 64, so that when the door 64 is in place, unauthorized manipulation of bolt 70 is prevented.

The clock mechanism occupies a receiving space in the lower shell 3. The clock mechanism is lowered until a strap 71 thereof engages over lugs 71' of the shell 3 to hold the clock mechanism in place. Also, the clock mechanism closely fits the receiving space in shell 3, so that a firm support results and no contact between the coin handling mechanism and the upper shell 2 is necessary.

The upper shell 2 rests upon the upper surface of the lower shell 3, and this meeting line is in a horizontal plane. The upper shell 2 is also formed with a depending lip 72 which extends down over the exterior of the lower shell 3 and forms a tight seal. Because of this joint between the upper and lower shells, it is impossible for rain to enter the interior of the casing.

Figures 1, 2, 13, 14, 15:
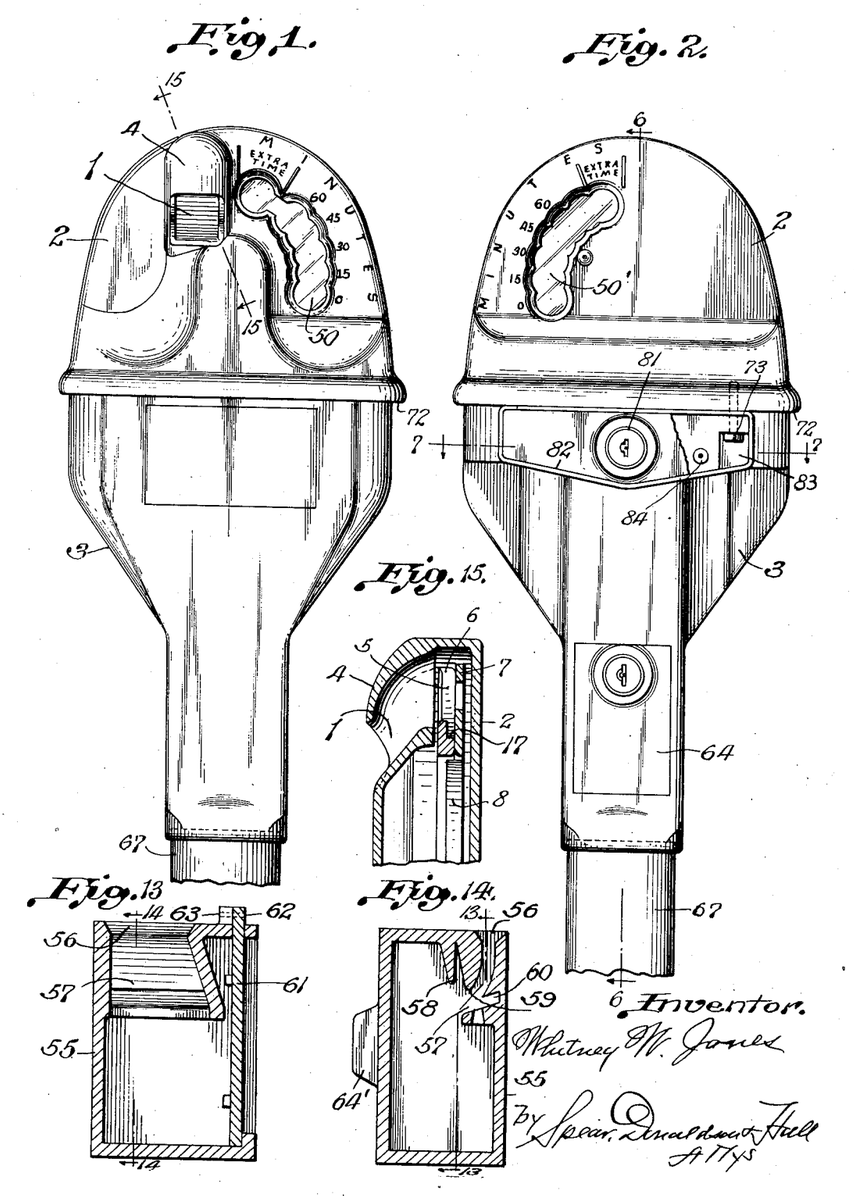
Figure 1 is a front elevation of the assembled device.
Fig. 2 is a rear elevation of Fig. 1.
Fig. 13 is a section through the coin box on the line 13—13 of Fig. 14.
Fig. 14 is a section on the line 14—14 of Fig. 13.
Fig. 15 is a section on the line 15—15 of Fig. 1.
Figures 3, 4, 16:
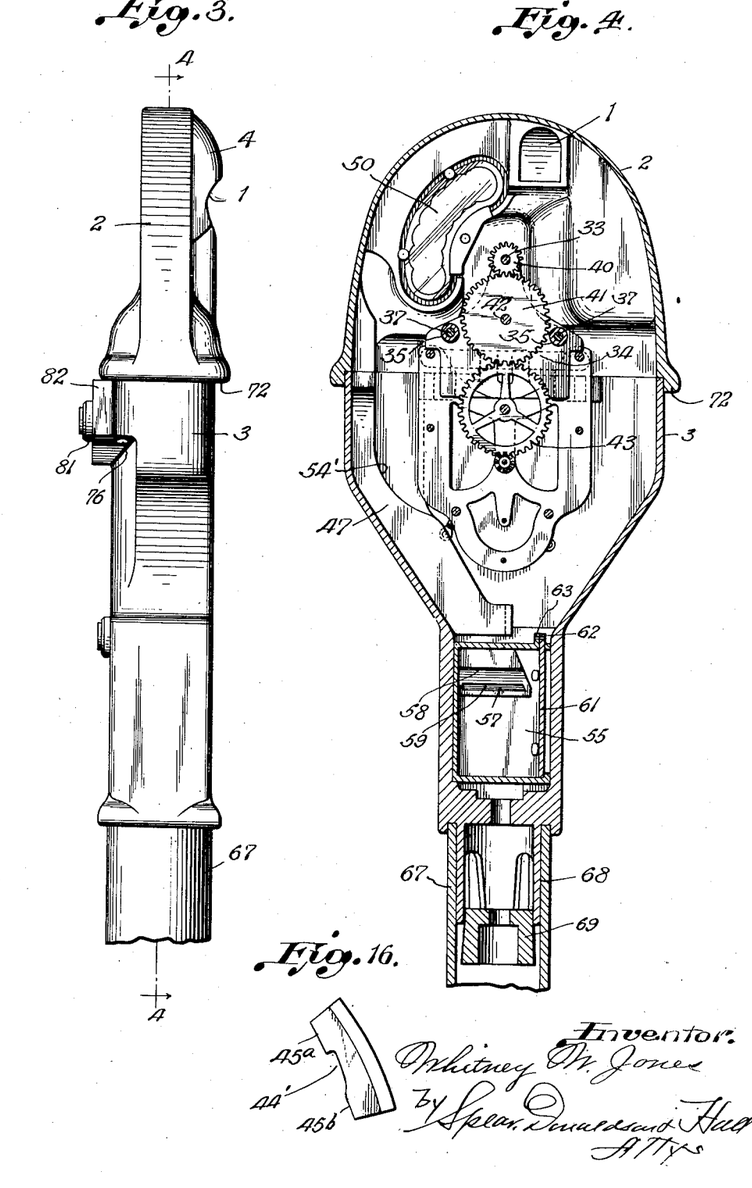
Fig. 3 is a side elevation from the left of Fig. 1.
Fig. 4 is a section on the line 4—4 of Fig. 3, the coin handling mechanism being omitted, but part of the driving gearing being shown.
Fig. 16 is an elevation of a modification of one of the coin presser blocks.
Figures 5, 6, 7, 7A:
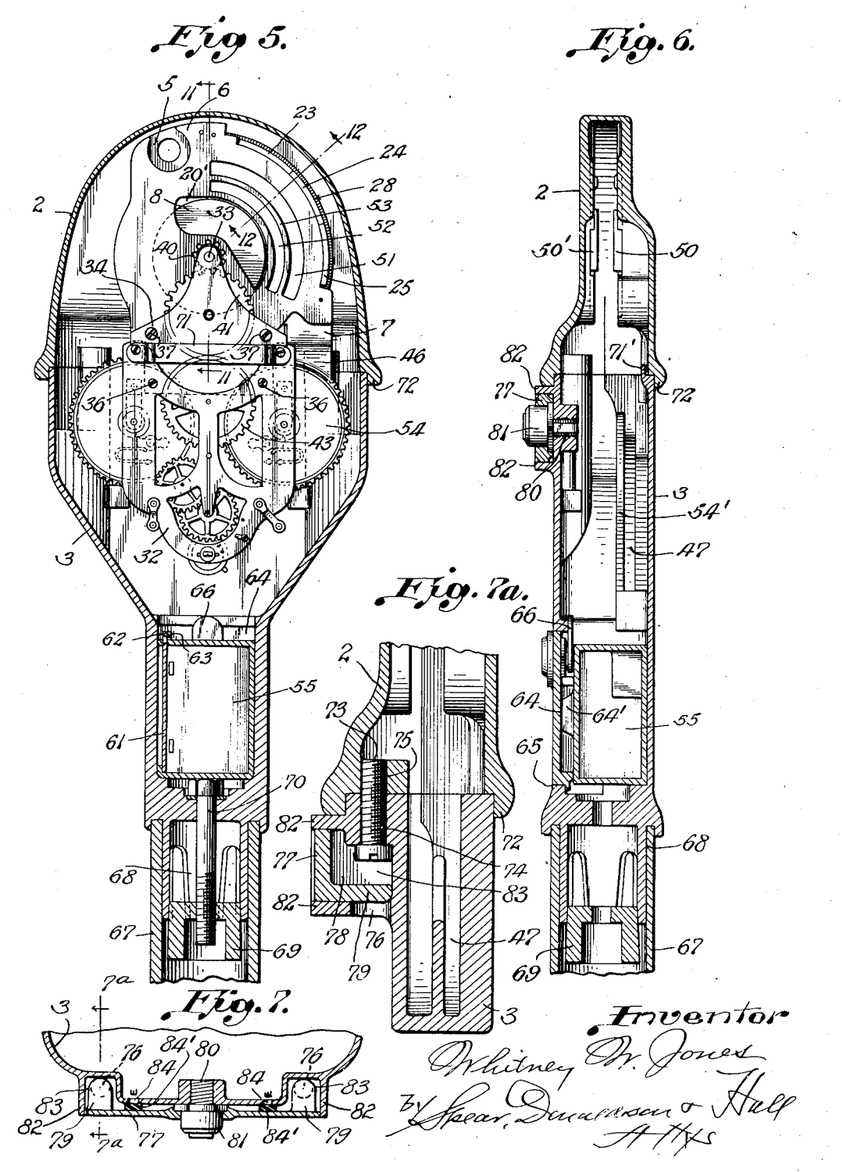
Fig. 5 is a front view similar to Fig. 1, the front wall of the casing being removed to show the preferred construction of the operating mechanism of the invention.
Fig. 6 is a section on the line 6—6 of Fig. 2 of the casing only.
Fig. 7 is a section on the line 7—7 of Fig. 2.
Fig. 7a is a section on the line 7a—7a of Fig. 7 on an enlarged scale.
Figure 8:
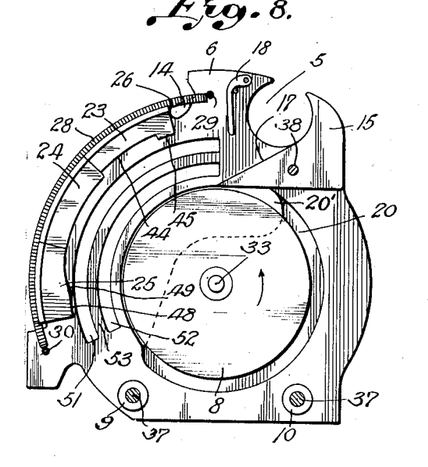
Fig. 8 is an elevation of the interior of the front plate of the operating mechanism appearing in Fig. 5.
Figure 9:
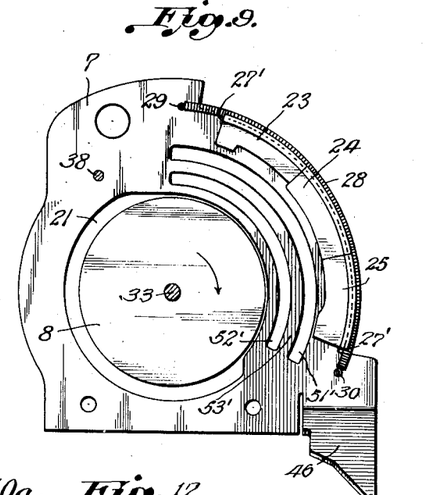
Fig. 9 is an elevation of the interior of the rear plate of the operating mechanism.

To clamp the upper and lower shells together, bolts 73 are passed upwardly through openings 74 in the lower shell and are threaded into the upper shell 2 at 75. To pass the bolts 73 through the opening 74, they must first be inserted upwardly through the openings 76 of the lower wall of an encircling flange 82 which projects horizontally from the shell 2, and which defines a recess 78 in the side of shell 2. Holes 76 are large enough to permit passage of the bolt heads therethrough. A screw driver may be inserted through the openings 76 to tighten the bolts 73. After the bolts 73 have been tightened, a plate 77 is positioned in the recess 78, and this plate is formed with projecting lugs 79 which enter a deep recess 83 occupied by the heads of bolts 73. These lugs 79 overlie the openings 76, as shown in Fig. 7a, and thereby prevent access through openings 76 to the screws 73.

Plate 77 fits within the encircling flange 82 and is held in place in the recess 78 by means of a screw 80 which threads into the body of shell 3. Screw 80 is formed integrally with the cylinder of a key controlled lock 81, so that the screw 80 may be screwed into or out of the shell 3 by means of the key. Removal of the plate 77 also gives access to the winding stems of the springs of the clock mechanism through the openings 84. To prevent rain water which might leak into the space 78 from flowing into the openings 84, rubber pads or gaskets 84' may be cemented to the inner face of plate 77 in position to seal the openings 84.

The exterior of shell 2 may be marked to indicate the relative position of the coin in its path of travel. Thus, at the initial part of the windows the notation "extra time" may be marked on the shell to correspond in position with the location of the coin when contacting the surface 45 of presser block 23. The further markings alongside the windows will be based upon the total time interval for which the device is normally set. Thus, if the device is to indicate a parking time of one hour, at the point on the casing opposite which the coin will lie when it first reaches the presser block 24 will be the marking "60." Other markings may be further alongside the windows to indicate the remaining parking time which is available.

The coin at all times serves as the indicator or pointer, and when no coin is visible it indicates an illegal parking. By being visible throughout the time that it is serving as a pointer, the coin may readily be inspected to determine whether it is genuine.

In the modification of the invention illustrated in Fig. 17, a single presser block or shoe 85 is employed instead of the plurality of blocks 23, 24, and 25. This presser shoe 85 may replace the blocks 23, 24, and 25 so that the remaining parts of the mechanism remain unchanged, and their details therefore need not be repeated.

The presser shoe 85 is pivoted to a pin 86 carried by the side plates 6 and 7. It is urged inwardly toward the disc by a spring 87 extending between the lower end of the presser shoe and a pin 88 carried by the side plates. To limit inward movement of the shoe 85, a pin 89 secured thereto may bear upon the outer edges of the side plates.

The initial coin contacting surface of this shoe 87 may be formed with an inwardly extending portion 91. A coin passing undeneath this projection 91' will urge the shoe 87 about pivot 86 and away from the disc 8, so that any coins which are upon the disc 8 at a point further along the shoe 87 will at once drop out of the mechanism. Only the last deposited coin can therefore be upon the disc 8 at any one time. The surface 92 following the point 91 will provide the additional time which is a feature of the invention, and the length of this surface may be made to give the desired extent of extra time.

Immediately following the extra time surface 92 is a cut-away portion 93 past which the coin can freely drop. This cut-away portion 93 will insure a separation between successively deposited coins to insure that the advance coin will be dropped out of the device by the aforementioned lifting action of the following coin.

Following the cut-away portion 93 is a surface 95 upon which the periphery of the coin rolls in its orbital movement about the disc. In passing along this inner surface 95 of the shoe, the desired normal length of parking time will be indicated.

If the device is to handle coins of two denominations, as nickels and pennies, this internal surface 95 may be so curved that a penny will not contact it until it has reached the point 96 which lies sufficiently close to the periphery of the disc to prevent further free passage of the penny. The penny will then roll only along the inwardly lying surface 97. In this respect, this contact point 96 corresponds to the shoulder 49 of presser shoe 25. If it is intended that the device handle coins of only one denomination, the inwardly lying surface 97 would be omitted, and the entire inner surface 95 would normally lie slightly closer to the disc 8 than the diameter of a nickel.

The embodiment of the invention illustrated in Figs. 18 to 23 may be substituted in the casing 2, 3 instead of the mechanisms illustrated in Figs. 1 to 17. This mechanism of Figs. 18 to 25 is so constructed that the coin which enters the opening 1 in the casing will pass to and through the coin slot 100. This coin slot is formed between a rear plate 101 and a front plate 102 which are separated by spacer plates 103 and 104. The rear plate 101 is secured to a supporting plate 105. Plate 105 is supported by a bracket 107 which is attached by the bolt 106 to the framework of the clock mechanism.

The spacer plate 103 is formed with an inclined surface 108, and the spacer plate 104 is provided with a surface 109 which lies in generally parallel relationship with the surface 108. The front plate 102 is formed with an opening 110 through which the coin enters from the opening 1 of the outer casing, in order to pass into the coin slot 100.

A coin carrying disc 112 is secured to a shaft 113 which is rotatable in a bearing in the supporting plate 105, and also in a plate 114 which is attached to the clock framework by means of the screws 115. This coin carrying disc 112 is made up of a disc 116 having a peripheral flange 117 which forms a peripheral shoulder 118 upon this disc 116. A spring disc 119 is secured against the forward face of the disc 116 by means of a disc 120 which is clamped against the disc 116 by means of screws 121. Disc 120 is keyed to shaft 113 at 121.

The outer edge of the spring disc 119 is formed with a plurality of radially extending slots so that the periphery of this disc presents a plurality of spring fingers 122. These spring fingers are curved so that they incline toward the flange 117, and then flare away from this flange 117, the central part of the spring fingers 122 lying closest to the flange 117. In this manner, a space is formed between the spring fingers 122 and the flange 117 for the reception of a coin.

Figure 22:
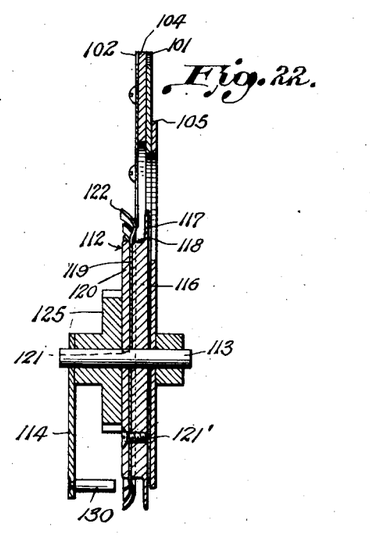
Fig. 22 is a section on the line 22—22 of Fig. 18.
Figure 23:
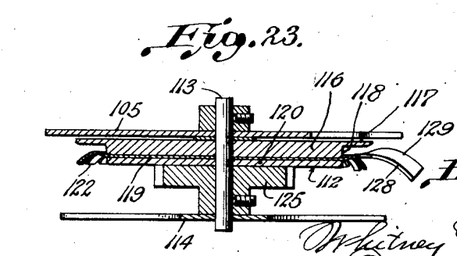
Fig. 23 is a section on the line 23—23 of Fig. 18.

The lower edge of the plate 102 is extended to enter into the space between the spring fingers 122 and the flange 117. This lower edge of plate 102 bears forcibly upon the spring fingers 122, as shown in Fig. 22, so as to urge them away from the flange 117 and widen the space therebetween. This widening of the space between flange 117 and the spring fingers 122 is at the point where the coin from the coin slot 100 will drop into this space. In this manner, the coin may immediately drop down upon the shoulder 118 of the disc 116 without being impeded by the spring fingers 122. As the disc 116 is rotated, the spring fingers opposite the coin are advanced away from the lower edge of the plate 102 and then spring toward the flange 117 and firmly grip the coin.

Because of the widening of the coin receiving space by the lower edge of plate 102, it is not necessary to exert any positive downward pressure upon the coin to force it downwardly between the flange 117 and the spring fingers 122. This is important because no irregular frictional drag need be exerted upon the clockwork mechanism in order to force coins down into this coin receiving space at the irregular intervals at which coins may be deposited. The lower edge of the plate 102, by bearing constantly upon the spring fingers 122 to force them away from the flange 117 and open up the coin receiving space, exerts a constant frictional drag on the clockwork mechanism so that once the clockwork mechanism has been adjusted to compensate for this drag, it will thereafter operate in a uniform manner.

To insure, however, that the coin will be firmly gripped between the flange 117 and the spring fingers 122, if, for some reason, the coin receiving space should inadvertently not be widened by means of the lower edge of the plate 102, the spacer plate 104 may be provided with a downwardly facing edge 123 which will exert a camming action upon the coin and force it down upon the shoulder 118. This provision of the camming surface 123 is merely a safety measure, and may not be provided if desired.

The shaft 113 is rotated by means of a gear 125 secured thereto. Gear 125 meshes with one side portion of a wide gear 126 which is rotatable upon a pin 130, which is firmly secured to the side plate 114. The other side portion of the wide gear 126 meshes wth the gear 127 of the clockwork mechanism. It will be apparent that this gear train must be so proportioned that the coin carrying disc 112 will turn through the desired number of degrees in a predetermined period of time under the driving action of the clockwork mechanism.

At the point at which it is desired that the coin shall leave the coin carrying disc 112 because it has passed through the desired number of angular degrees, a space widening member 128 is provided. The member 128 is carried by an arm 131 attached to a collar 132 upon one of the bolts 106. This member 128 enters the coin space and forcibly bears against the spring fingers 122 so as to force them away from the flange 117. This will cause the coin to drop out of this space under the action of gravity, and the coin will thereafter be conducted by means of a flange portion 129 of the space widening member 128 to the coin discharge chute 47.

If it is desired that the total length of time which the coin will indicate include a limited amount of overtime, this may be provided for by merely locating the space widening member 128 further away from the initial space widening member formed by the lower edge of the plate 102. As with the earlier forms of this invention, the coin, in being carried about the axis of the shaft 113, will be visible on both of its sides, this visibility being possible because the windows of the casing would be in registry with the arcuate path of movement of the coin. Since the coin is used as the pointer in this modified form of the invention, not only may the genuineness of the coin be examined through the windows, but the time which is indicated by the coin may be determined from a distance.

I claim:

1. A time indicating device comprising a rotatable member providing a circular peripheral surface, means for rotating said member, and means for retaining a coin in contact with said circular peripheral surface during at least a fraction of a complete rotation of said member to cause the coin to have a rolling contact therewith and also an orbital motion about the axis of said member, said last named means including a plurality of separately movable elements spaced radially outwardly from said rotatable member and presenting an inwardly facing surface to contact the periphery of the coin, means for urging said elements toward said rotatable member to maintain the coin against the circular peripheral surface thereof, and means along the path of travel of the coin for measuring the extent of movement of the coin, and thereby indicating a determinable time period.

2. A time indicating device according to claim 1 in which each of said elements is of short length so that not more than two coins can contact the inwardly facing surface thereof at one time.

3. A time indicating device comprising a rotatable disc, guide means disposed about at least a portion of the periphery of the disc to retain a coin upon the periphery of the disc, a plurality of separately movable presser blocks arranged end to end and spaced radially outwardly from the disc and presenting a surface opposing and concentric to the periphery of the disc, means for urging the presser blocks toward the axis of the disc to press the coin against the periphery of the disc, means for driving the disc, and means along the path of travel of the coin for measuring the extent of movement of the coin and thereby indicating a determinable time period.

4. A time indicating device according to claim 3 in which said means for urging the presser blocks toward the disc is a coil spring encircling the blocks under tension.

5. A time indicating device according to claim 3 in which the presser blocks are separated from each other on radial lines from the axis of the disc passing through the centers of side by side coins upon the disc periphery.

6. A time indicating device comprising a rotatable disc, guide means disposed about at least a portion of the periphery of the disc to retain a coin upon the periphery of the disc, a plurality of separately movable presser blocks arranged end to end and spaced radially outwardly from the disc and presenting a surface opposing and concentric to the periphery of the disc, means for urging the presser blocks toward the axis of the disc to press the coin against the periphery of the disc, means for driving the disc, the first of said presser plates having a cut-away portion leaving only a limited length of coin contacting surface, and means along the path of travel of the coin for measuring the extent of movement of the coin and thereby indicating a determinable time period.

7. A time indicating device according to claim 6 in which said cut-away portion succeeds an initial coin contacting portion.

8. A time indicating device according to claim 6 in which the last of said presser blocks has a terminal portion projecting close toward the periphery of the disc to contact a small coin.

9. A time indicating device comprising a pair of plates spaced from each other and having a centrally located disc receiving opening, a disc rotatably mounted in said opening and in line with the space between the plates, said plates presenting edges on opposite sides of the disc and generally concentric with the disc, at least one presser block having side portions resting on said concentric edges and having a central depending part extending into the space between the blocks and toward the disc, means for yieldably urging the presser block toward the disc, and means along the path of travel of the coin for measuring the extent of movement of the coin and thereby indicating a determinable time period.

10. A time indicating device comprising a rotatably mounted circular member providing a continuous peripheral coin receiving recess, one side wall of said recess being resilient to permit the entrance of a coin into said recess and to grip the entered coin, means for causing the entrance of a coin into said recess, means for causing the coin to leave said recess means for moving said circular member to carry a coin from said means for causing the entrance of a coin to said means for causing the coin to leave said recess, and means along the path of travel of the coin for measuring the extent of movement of the coin and thereby indicating a determinable time period.

11. A time indicating device according to claim 10 in which each of said means comprises a shoe which bears upon said resilient side wall to widen the recess beyond the width of the coin.

WHITNEY W. JONES.